United States Patent [19]

Cheng

[11] Patent Number: 5,377,368
[45] Date of Patent: Jan. 3, 1995

[54] COLLAPSIBLE BABY BED

[75] Inventor: Ying-Hsiung Cheng, San Diego, Calif.

[73] Assignee: Top Fortune Ltd., San Diego, Calif.

[21] Appl. No.: 110,927

[22] Filed: Aug. 24, 1993

[51] Int. Cl.⁶ .............................................. A47D 7/00
[52] U.S. Cl. ............................................ 5/991; 403/97; 16/329
[58] Field of Search ................ 5/98.1, 98.3, 99.1; 16/327–332; 403/93, 97, 327

[56] References Cited

U.S. PATENT DOCUMENTS

| | | | |
|---|---|---|---|
| 1,374,333 | 4/1921 | Stotler et al. | 5/98.3 |
| 1,413,068 | 4/1922 | Stotler et al. | 5/98.3 |
| 4,688,280 | 8/1987 | Kohus et al. | 5/99.1 |
| 5,168,601 | 12/1992 | Liu | 16/329 X |
| 5,197,154 | 3/1993 | Shamie | 5/99.1 |
| 5,239,714 | 8/1993 | Huang | 5/99.1 |
| 5,243,718 | 9/1993 | Shamie | 5/99.1 |
| 5,279,006 | 1/1994 | Teng | 5/99.1 |

*Primary Examiner*—Michael F. Trettel
*Attorney, Agent, or Firm*—Morton J. Rosenberg; David I. Klein

[57] ABSTRACT

A collapsible baby bed includes four pairs of two upper horizontal side rods connected with four bending means, four corner connectors connecting two pairs of two upper horizontal side rods, two V-shaped connecting tubes connected with a pair of lower horizontal rods also connected with two foot rods, two inverted U-shaped bottom frames pivotally connected with two V-shaped connecting tubes. The four foot rods and the vertical poritons of the inverted U-shaped bottom frames stand on the ground soas to support this bed when it is spread out. The four bending means and a pivotal pin combined the two V-shaped connecting tubes and the inverted U-shaped bottom frames enable this bed collapsed.

2 Claims, 13 Drawing Sheets 5,377,368

COLLAPSIBLE BABY BED

BACKGROUND OF THE INVENTION

FIELD OF THE INVENTION

This invention relates to collapsible baby beds. In particular, this invention directs itself to baby beds which may be collapsed in an optimum manner with little effort.

PRIOR ART

A prior art collapsible baby bed is shown in FIG. 14 and has a simplified frame structure. However, the pivotal bending mechanisms 10 and 20 cannot be kept stable, and do not have locking mechanisms, thus they may be displaced by unexpected forces. Additionally, the mattress is supported only by a central bowl-shaped supporter 30 and four corner feet 40. This support structure is not strong enough to support the bed mattress in a flat manner and is not comfortable for a baby lying thereon.

Another prior art collapsible baby bed is shown in FIG. 15 and has upper side horizontal rods 50 connected with bending mechanisms 60, 70 as well as corner connectors 80, however, the bending mechanisms 60, 70 are formed of many interacting elements which increase the cost of manufacture.

SUMMARY OF THE INVENTION

This invention has been devised to offer a collapsible baby bed with the following desirable features:

1. Concise structure, easy to be spread out and stably constructed for setting on the ground.

2. Having a bending mechanism for collapsing the bed, which is able to maintain the horizontal rods in a stable location and not easily bent down.

3. Having four lower horizontal rods and two inverted U-shaped bottom frames combined with the horizontal rods to support the weight of a baby lying on the bed, which are strong enough to support the baby when lying on the bed.

4. Removable bed cloth and collapsible mechanisms for collapsing the bed into a comparatively small volume for storage.

DESCRIPTION OF THE PREFERRED EMBODIMENTS

Figure 1:
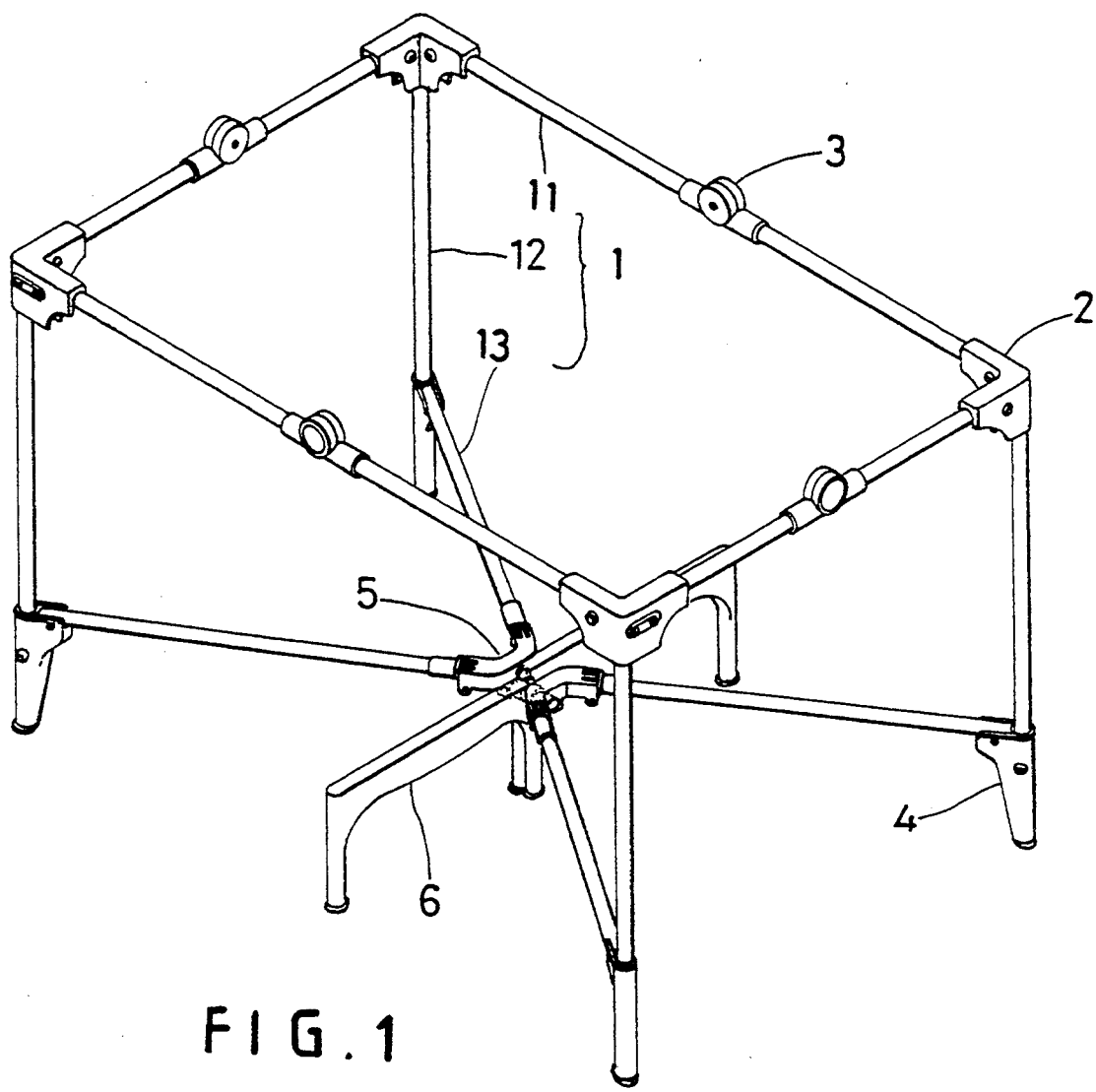
FIG. 1 is a perspective view of a collapsible baby bed of the present invention.
Figure 2:
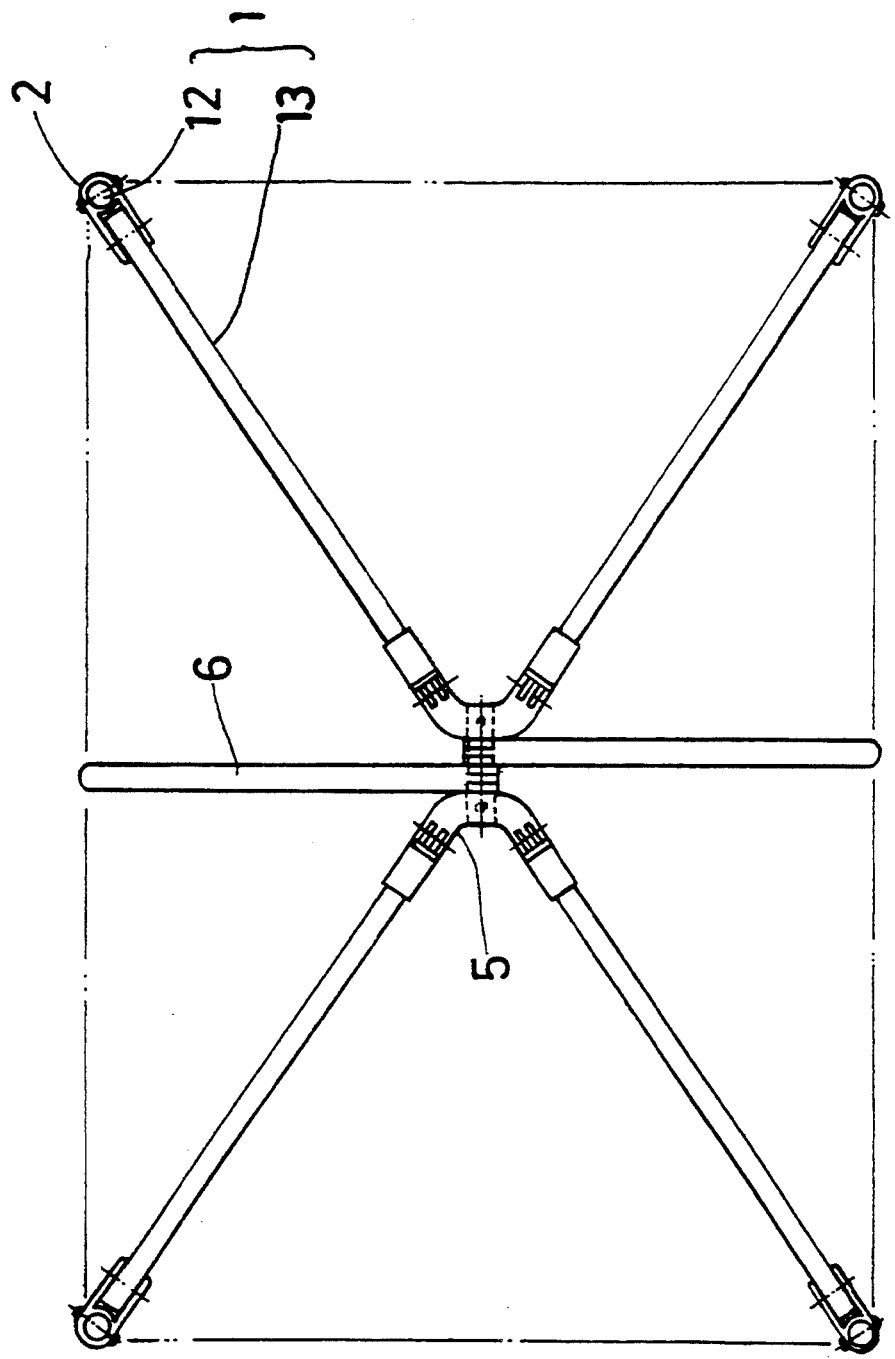
FIG. 2 is a plan view of a lower portion of the collapsible baby bed of the present invention.

The collapsible baby bed of the present invention concept is shown in FIGS. 1 and 2, and includes a plurality of side rods 1 which include four pairs of upper horizontal side rods 11, two pairs of lower horizontal support rods 13 and four foot rods 12. The collapsible bed further includes four corner supporters 2, four rotatably lockable connector mechanisms 3, four foot end supporters 4, two V-shaped connecting tubes 5, and two inverted U-shaped bottom frames 6, which are coupled to form the collapsible baby bed frame construction.

Each pair of upper horizontal side rods 11, 11 are connected to respective corner supporters 2 by screws or rivets, and are further connected with respective rotatably lockable connector mechanisms 3 as shown which form one upper side of a rectangular upper horizontal portion of the collapsible baby bed. Four vertical foot rods 12 are respectively fixedly connected with each corner supporter 2 at an upper end of the foot rods 12, with the rods 12 bottom end fixed to a respective foot end supporter 4. Each lower horizontal support rod 13 is mounted between each foot end supporter 4 and one end portion of each V-shaped connecting tube 5. The two inverted U-shaped bottom frames 6, 6 are located between the apices of the two V-shaped connecting tubes 5, 5 at the intermediate portions, as shown in FIG. 2. Frames 6, 6 have vertical ends extending to and interfacing with the ground.

Figure 3:
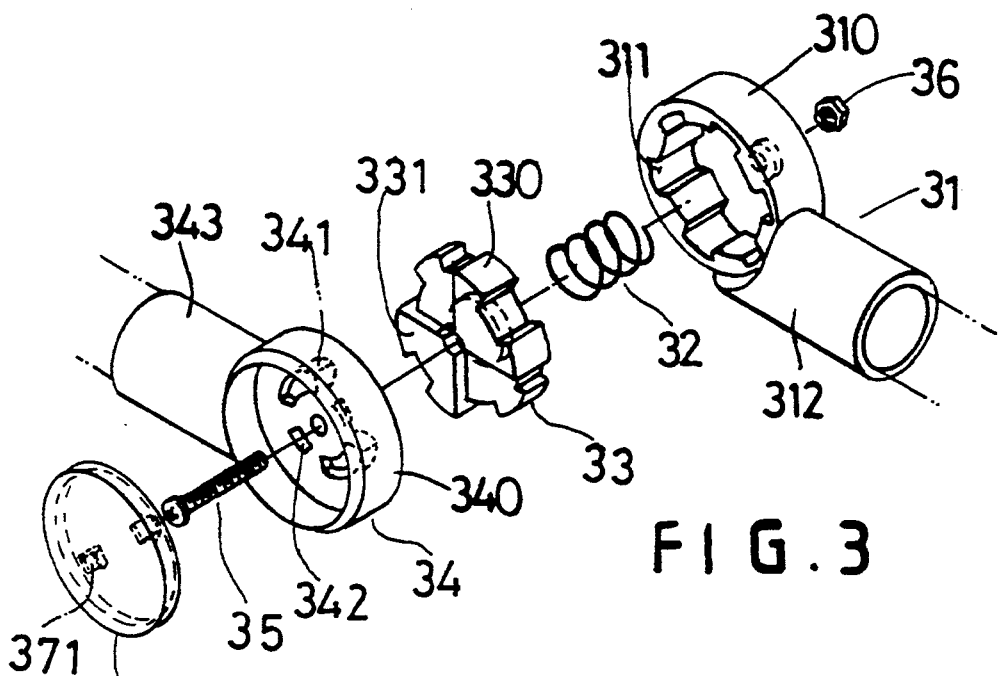
FIG. 3 is an exploded perspective view of a bending mechanism of the collapsible baby bed of the present invention.
Figure 4:
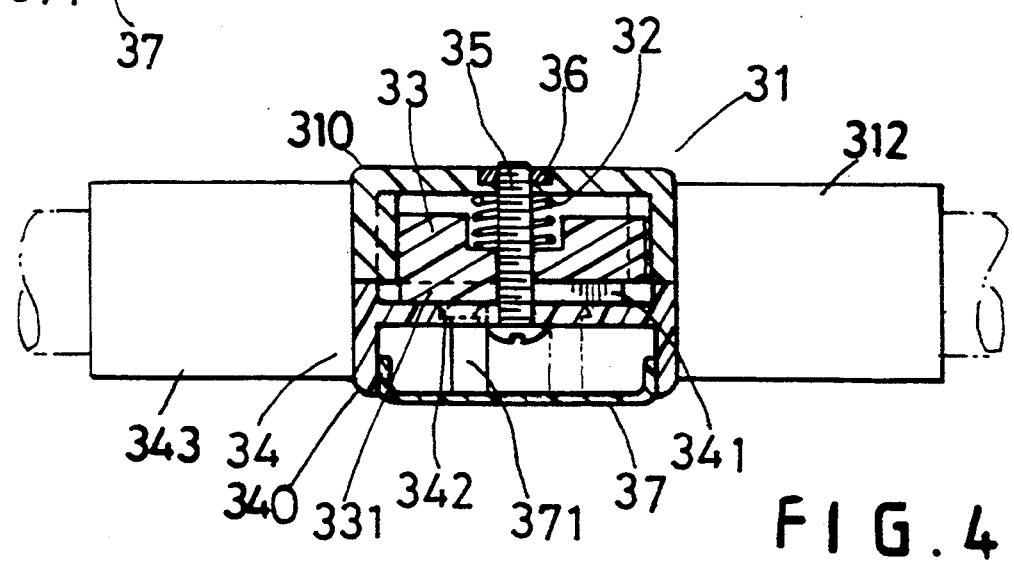
FIG. 4 is a cross-sectional view of the bending mechanism of the collapsible baby bed of the present invention.
Figure 5:
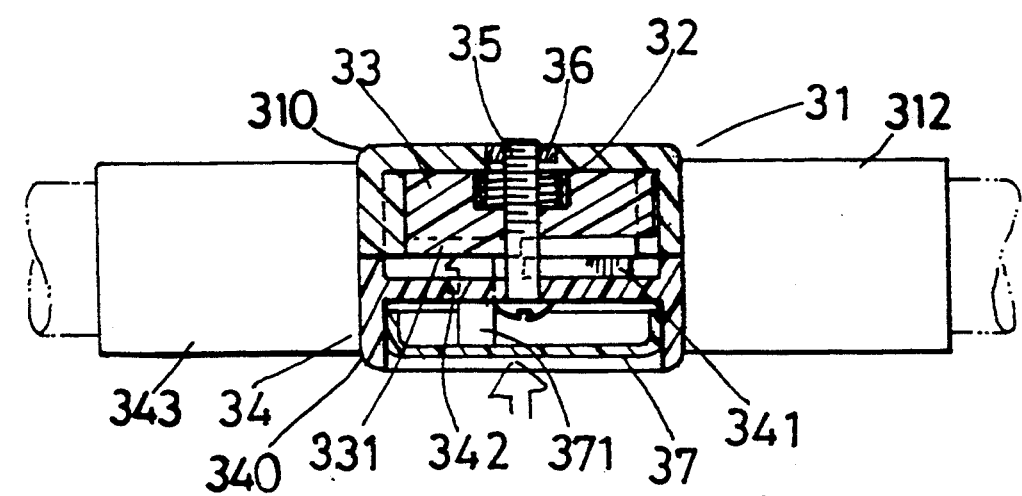
FIG. 5 is a further cross-sectional view of the bending mechanism of the collapsible baby bed of the present invention.

Each of the four bending or rotatably lockable connector mechanisms 3 shown in FIGS. 3, 4 and 5 has a first cylindrical cap 31, a spring 32, a fitting block 33, a second cylindrical cap 34, a push disk 37, a bolt 35 and a nut 36. The first cylindrical cap 31 has a cylindrical disk portion 310 and a tubular portion 312. The cylindrical disk portion 310 has formed therein a plurality of radial inner grooves 311 spaced around an inner circumferential surface of disk portion 310. The spring 32 extends laterally into a hollow interior of the cylindrical disk portion 310 and abuts a lateral side wall thereof. The fitting block 33 is reversibly displaceable and may move right and left in the cylindrical disk portion 310 and has several projections 330 spaced on its outer curved surface to engage several inner grooves 311 and fan-shaped projections 331. The second cylindrical cap 34 has a cylindrical disk portion 340 and a second cap tubular portion 343, and further has a right lateral side provided with two fan-shaped projections 341, 341 to engage with the fan-shaped projections 331 of the fitting block 33. A rectangular hole 342 is also formed through the lateral side wall, as shown in FIG. 3. Bolt 335 is inserted from the left side through the second cylindrical cap 34, the fitting block 33, the spring 32 and finally the first cylindrical cap 31 and is threadedly engaged to the nut 36. The push disk 37 has a rectangular tenon 371 extending inward to fit through the rectangular hole 342 and adapted to push against the fitting block 33 and displace the block 33 when the push disk 37 is displaced.

Figure 6:
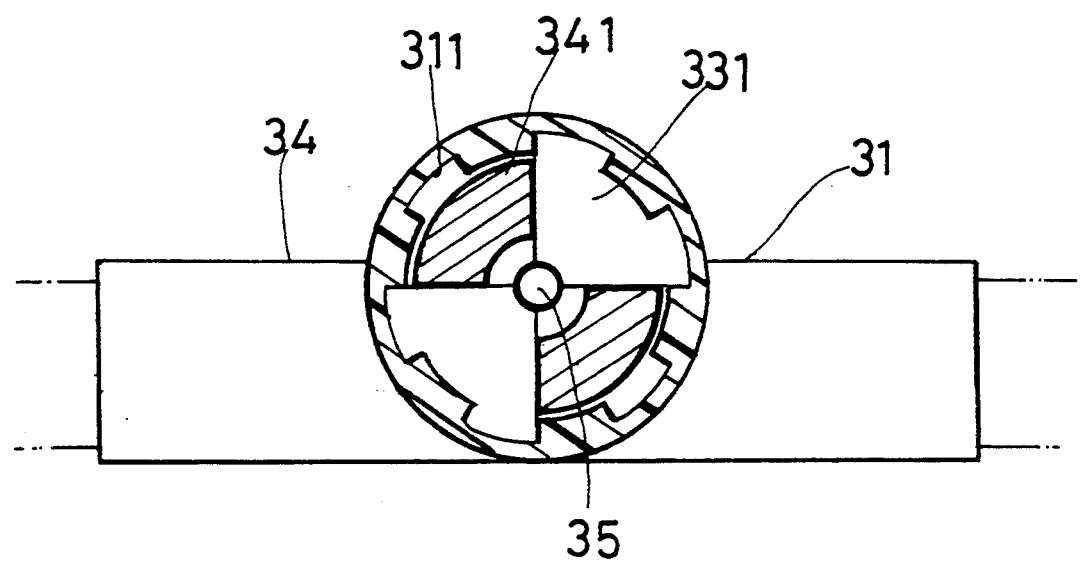
FIG. 6 is a cross-sectional view of the bending mechanism of the collapsible baby bed of the present invention showing the bending mechanism in a locked condition.
Figure 7:
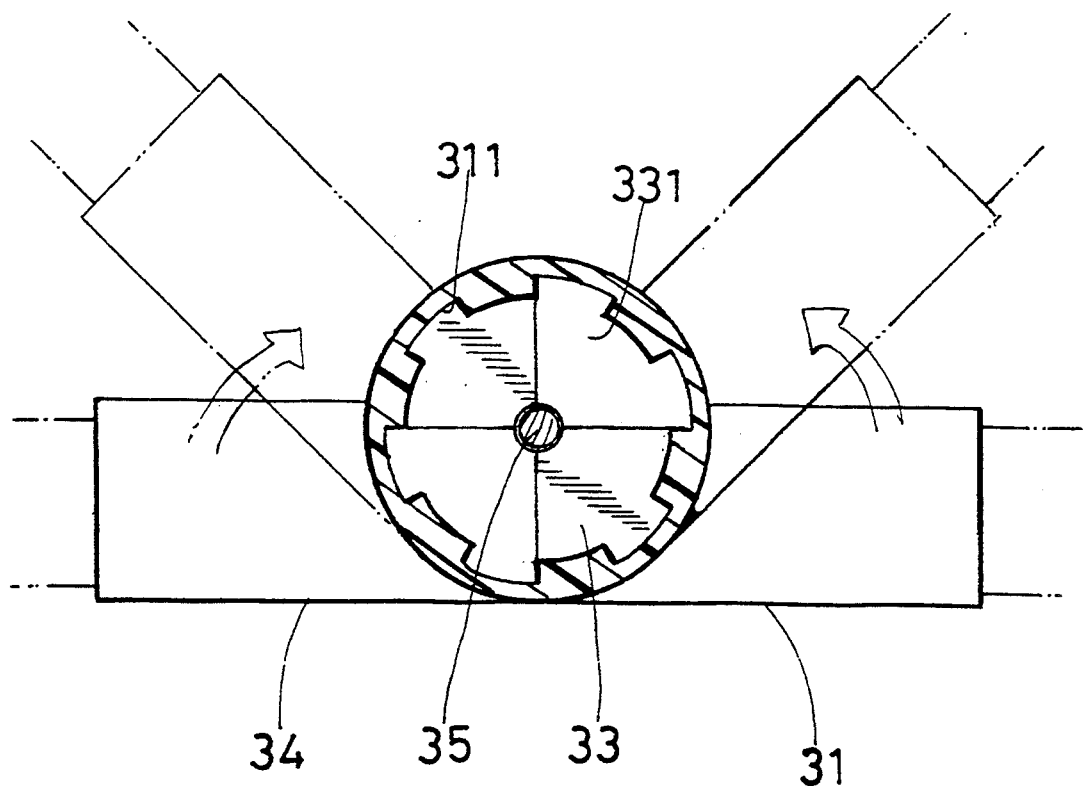
FIG. 7 is a cross-sectional view of the bending mechanism of the collapsible baby bed of the present invention showing the bending mechanism in an unlocked condition.

When the first cylindrical cap 31 is kept in aligned position to the second cylindrical cap 34 after the rotatably lockable connector mechanism 3 has been coupled as shown in FIGS. 4 and 6, the fitting block 33 is biased by the spring 32, and is forced to engage the fan-shaped projections 341, 341 of the second cylindrical cap 34 so that the rotatably lockable connector mechanism 3 is in a non-rotatable and locked condition. But when the push disk 37 is pressed down as shown in FIGS. 5 and 7, the tenon 371 of the push disk 37 pushes against and displaces the fitting block 33 which then disengages from the first cylindrical cap 31 enabling the first cylindrical cap 31 to rotate relative to the second cylindrical cap 34 so that respective pairs of the upper horizontal side rods 11, 11 may be bent down together with the rotatably lockable connector mechanisms 3 for collapsing the bed.

Figure 8:
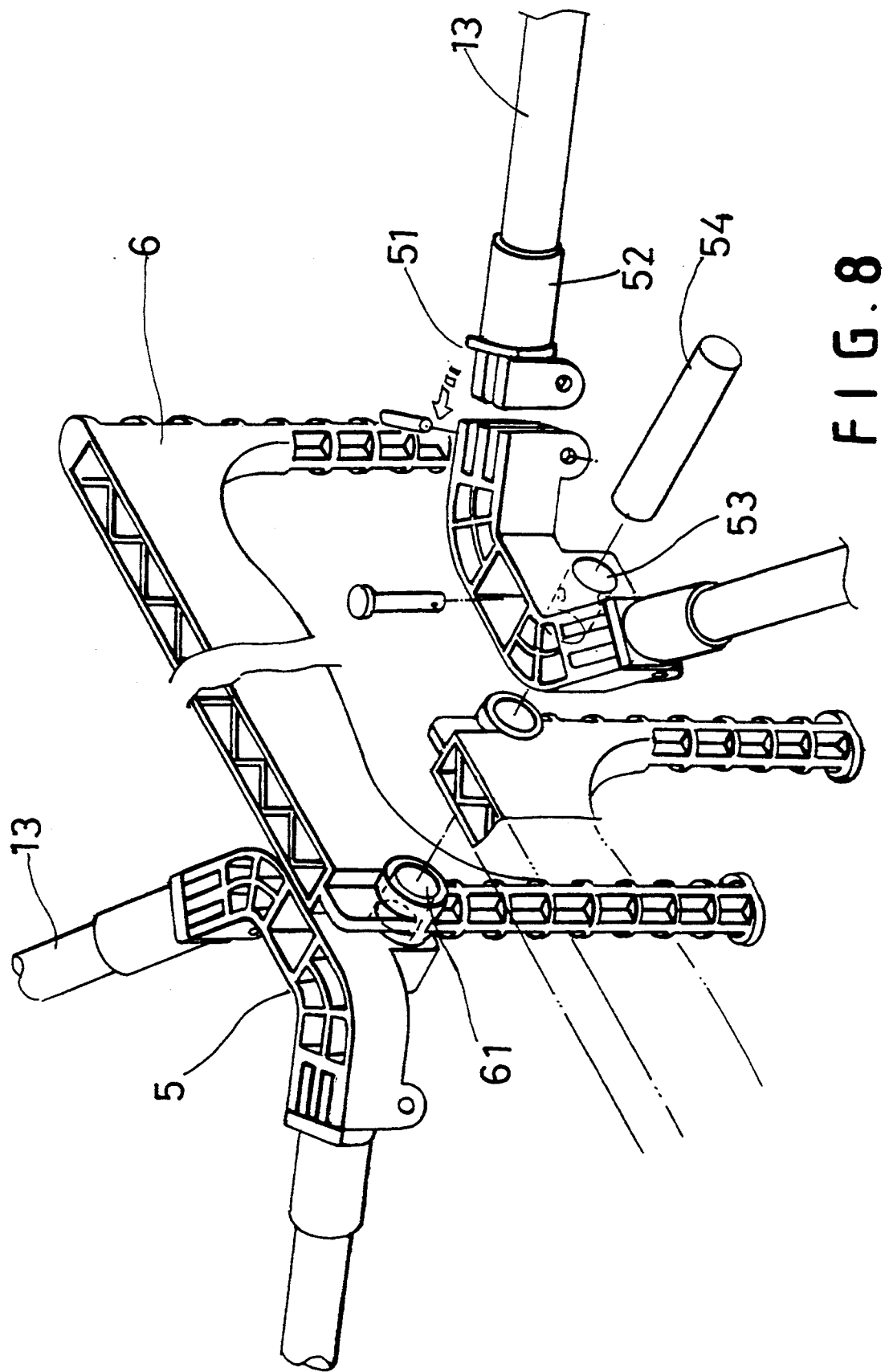
FIG. 8 is a perspective view of a pivotal mechanism and an inverted U-shaped bottom frame of the collapsible baby bed of the present invention.

Each of the V-shaped connecting tubes 5 shown in FIG. 8 has two connectors 51, 51 pivotally connected with both ends of a V-shaped body with a pin hole 53 formed in a lower middle portion of the body for a pivotal pin 54 to pass through to pivotally connect the connecting tube 5 with the inverted U-shaped bottom frame 6. The connector 51 has a rear tubular portion 52 to be coupled to an end of a lower horizontal support rod 13.

Each inverted U-shaped bottom frame 6 has a plurality of reinforcing inner ribs, having a pivotal hole 61 formed through one end as shown in FIG. 8 for the pivotal pin 54 to pass through to couple each bottom frame 6 with the V-shaped connecting tube 5.

Figure 9:
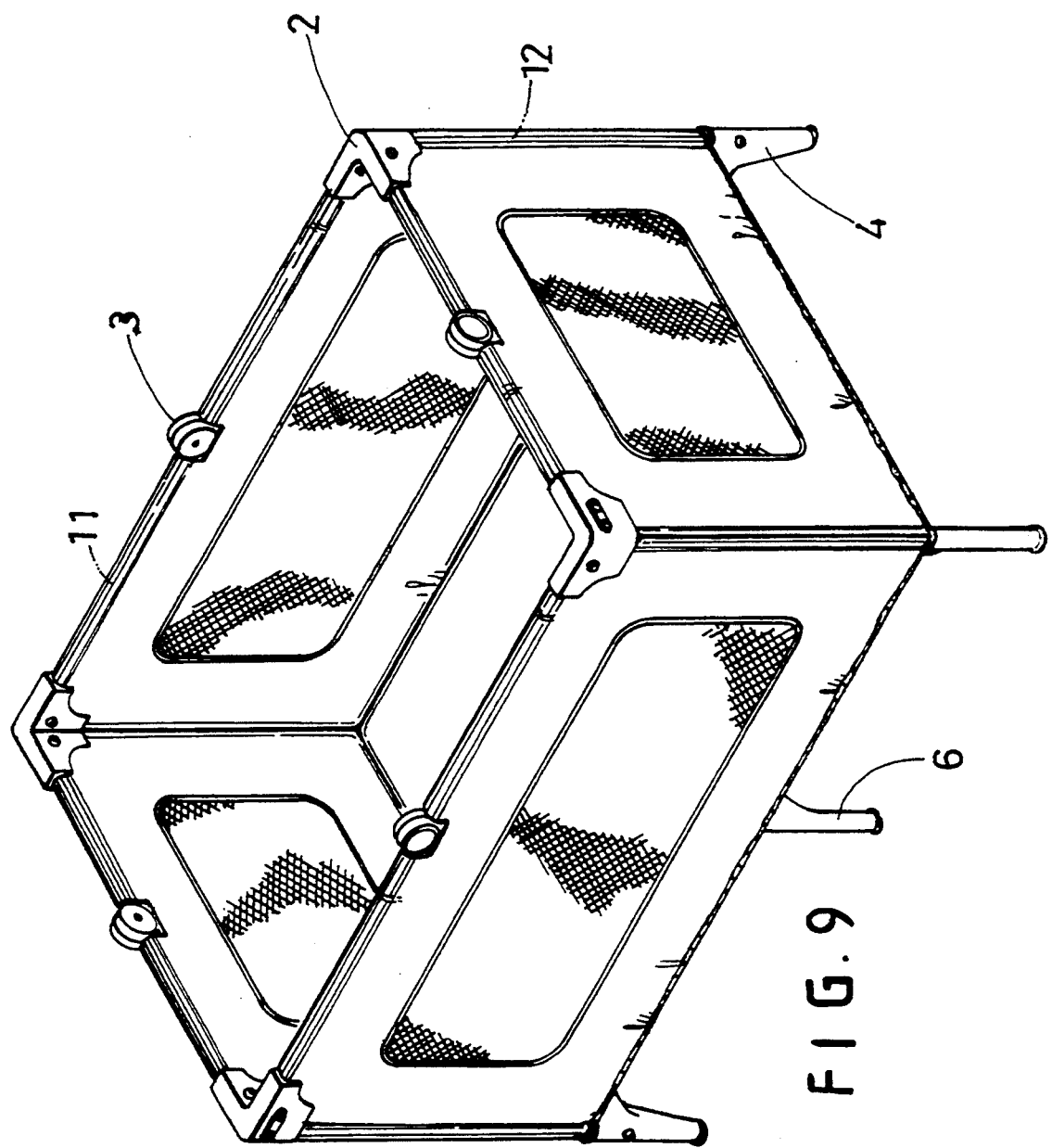
FIG. 9 is a perspective view of the collapsible baby bed attached with bed covers in the present invention.
Figure 10:
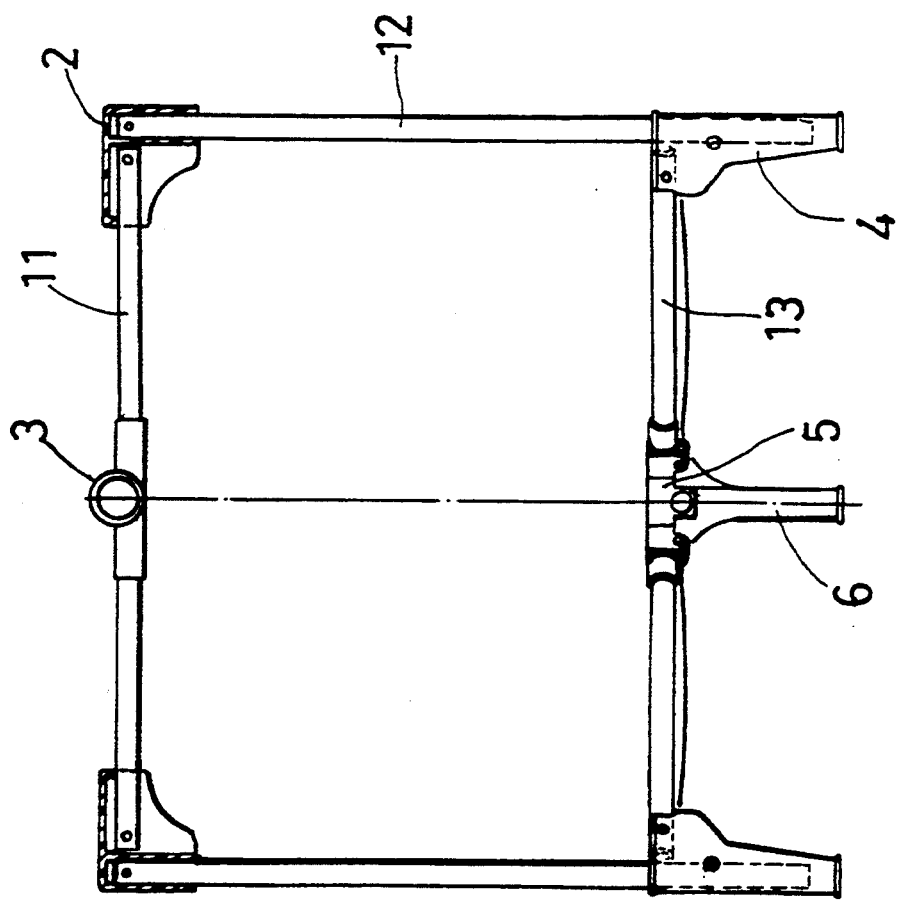
FIG. 10 is a side view of a bed frame of the collapsible baby bed of the present invention.

After the frame of the baby bed has been assembled, bed covers are adapted to surround the four vertical sides as shown in FIGS. 9 and 10, and a bed mattress is placed on the bottom, with the rotatably lockable connecting mechanism 3 being locked in a horizontal plane, holding the upper side rods 11 in a horizontal condition. The four lower horizontal support rods 13 are coupled firmly together with the inverted U-shaped bottom frame 6, 6 to support the weight of a baby lying on the bed.

Figure 11:
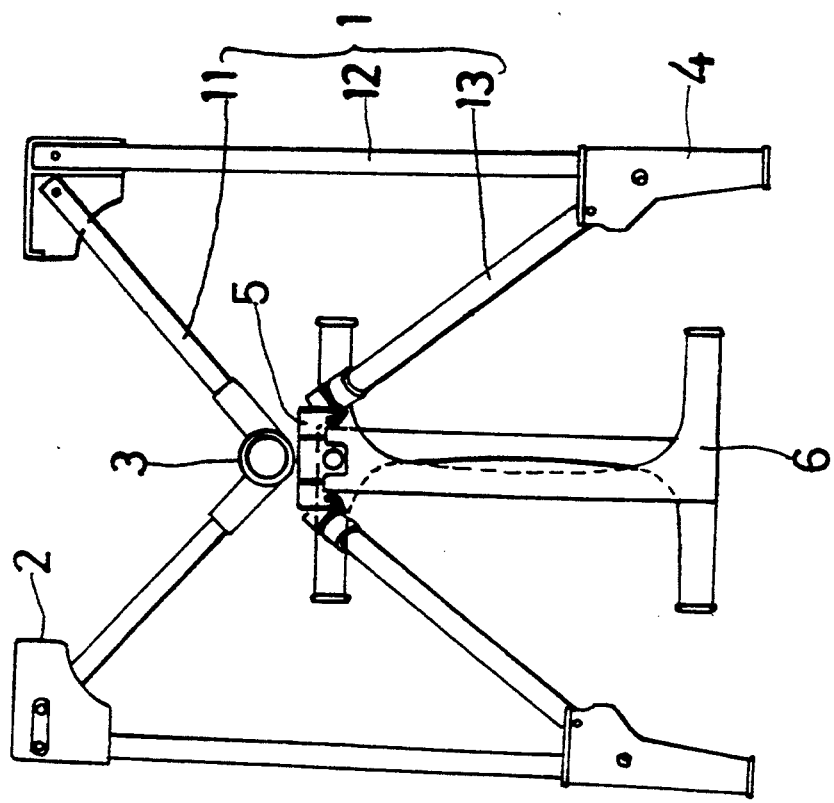
FIG. 11 is a side view of the bed frame collapsed in the collapsible baby bed of the present invention.
Figure 13:
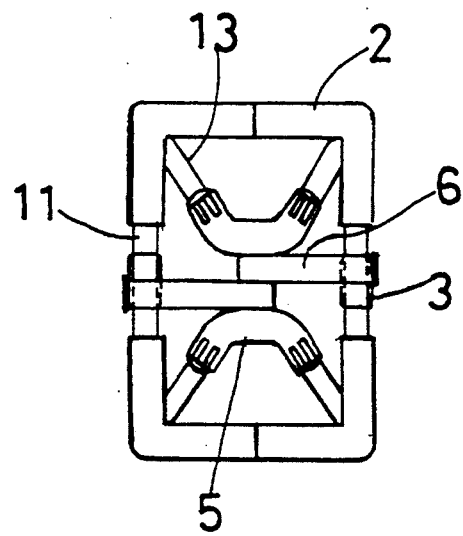
FIG. 13 is a plan view of FIG. 12.
Figure 12:
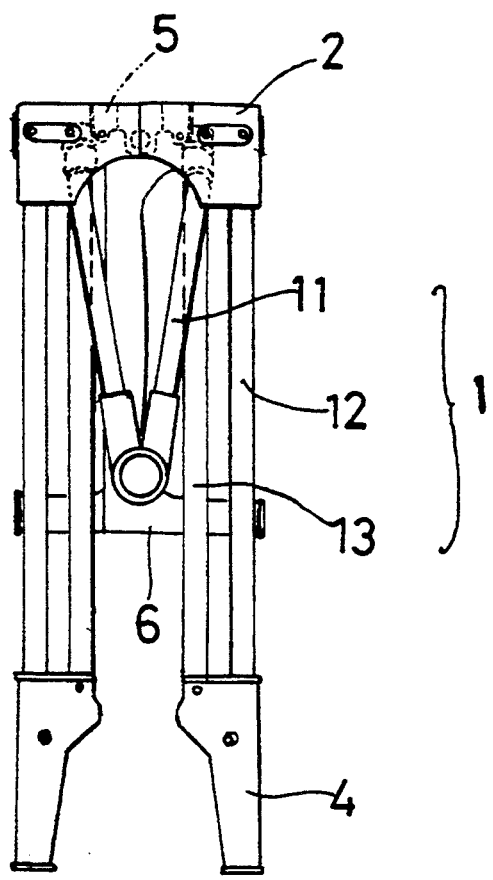
FIG. 12 is a side view of the collapsible baby bed collapsed in the present invention.
Figure 14:
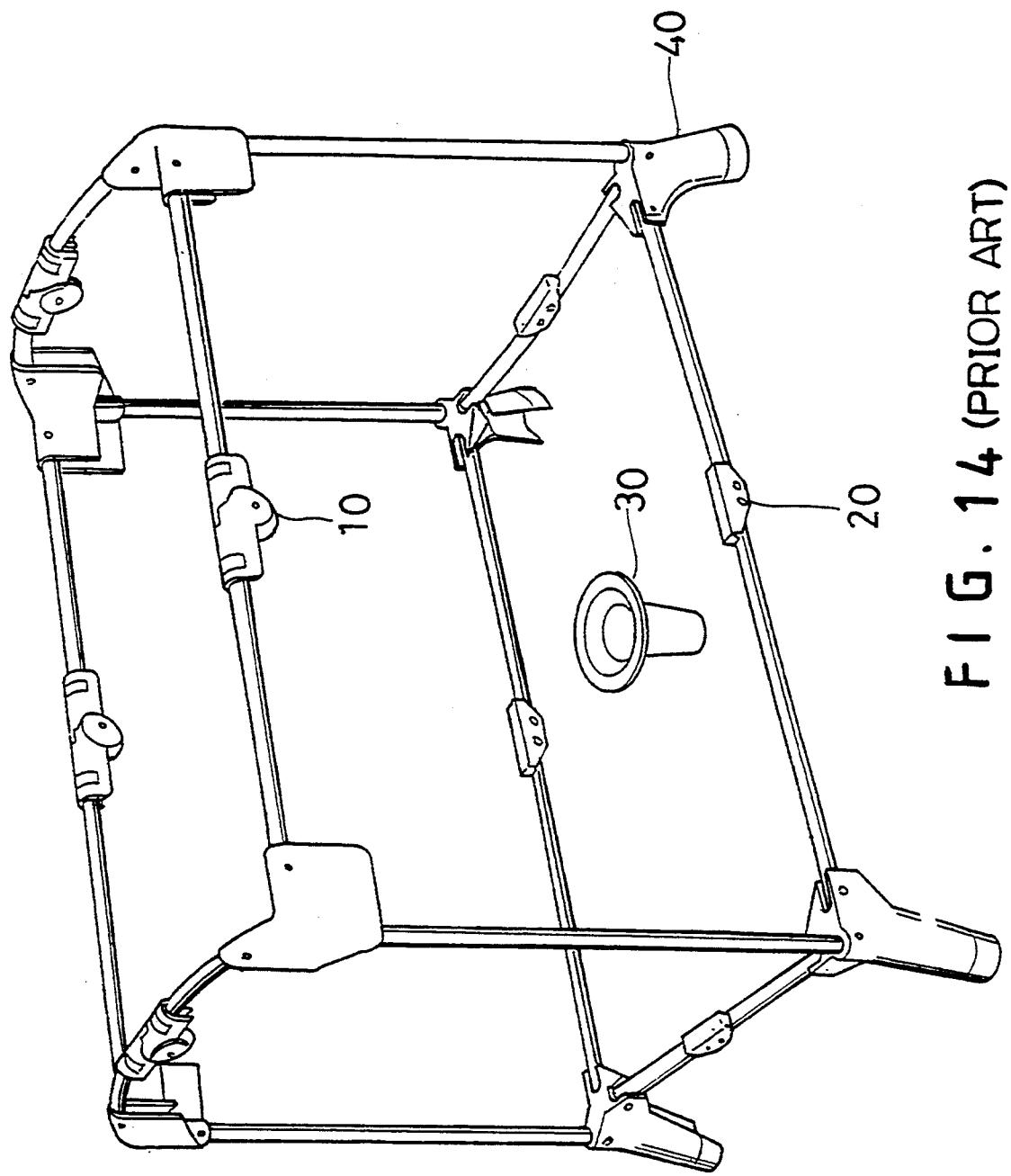
FIG. 14 is a perspective view of a frame of a prior art collapsible baby bed.
Figure 15:
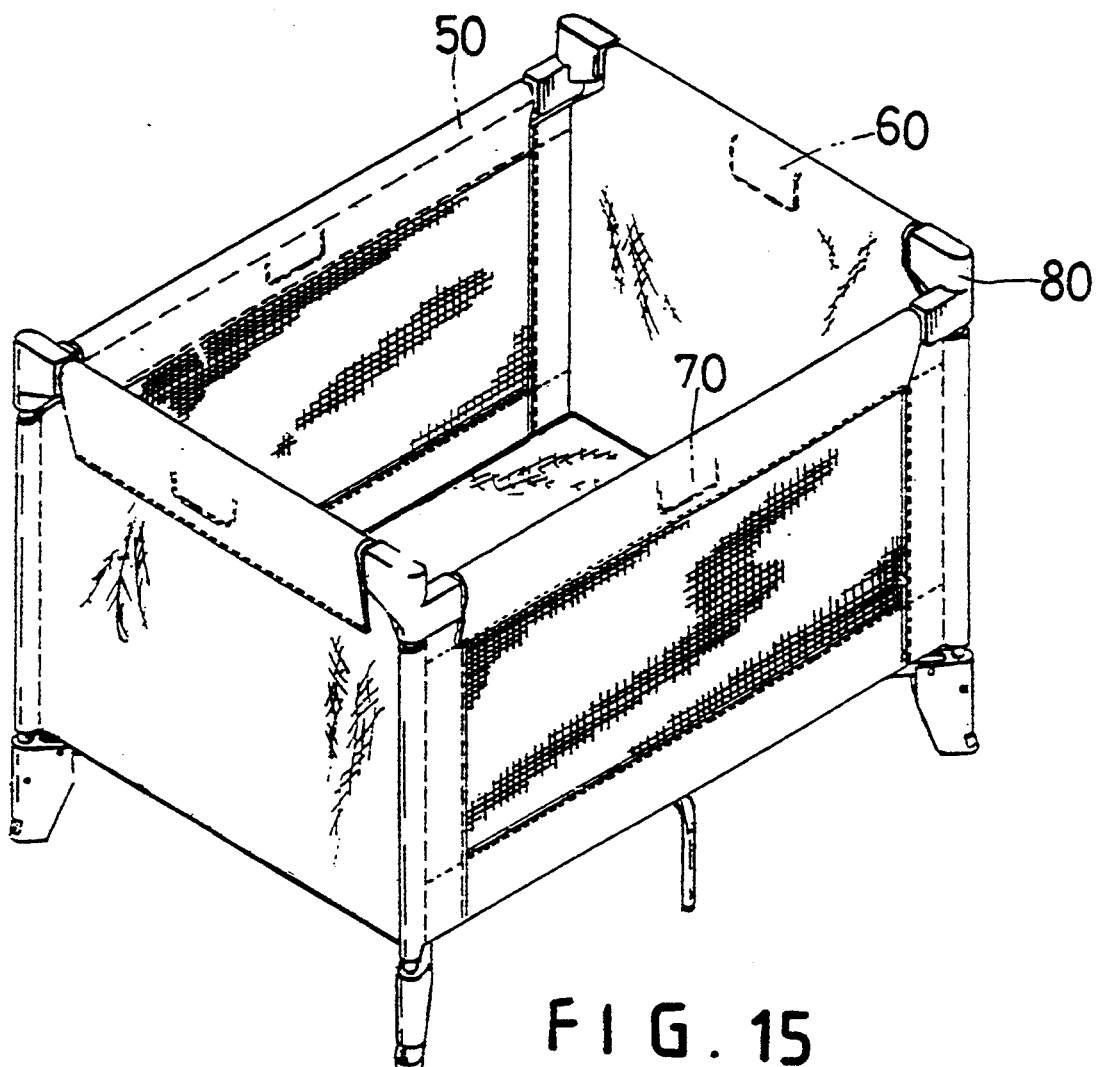
FIG. 15 is a perspective view of another prior art collapsible baby bed.
Figure 16:
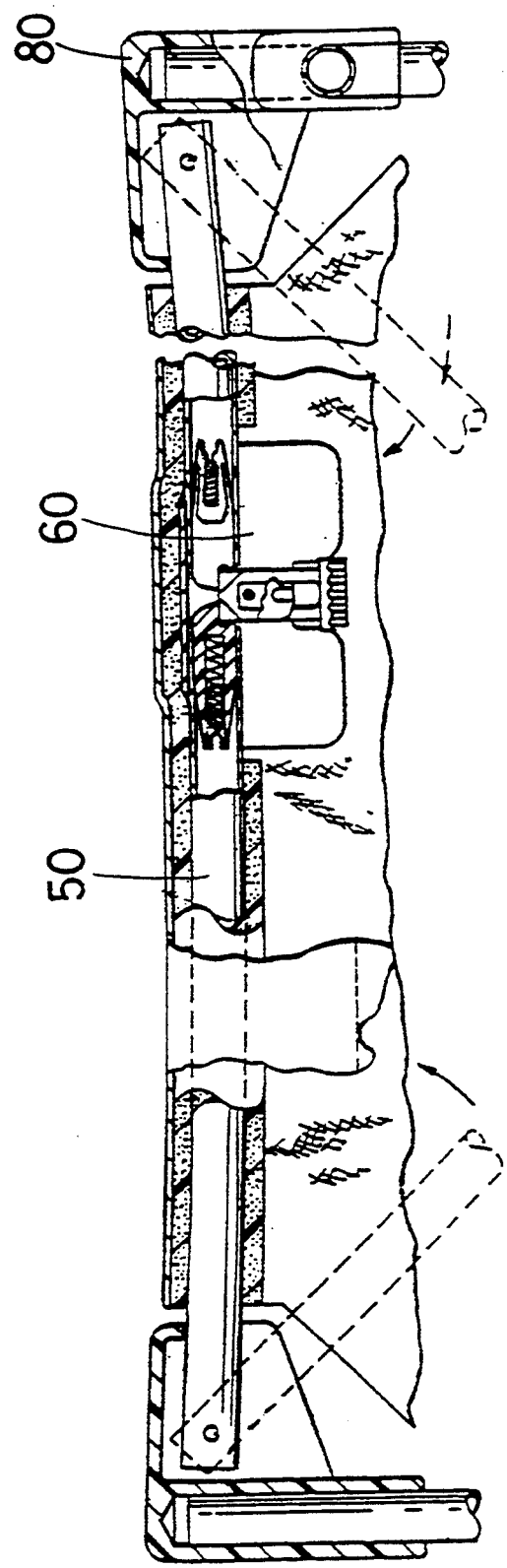
FIG. 16 is a cross-sectional view of a bending mechanism of the prior art collapsible baby bed in FIG. 15.
Figure 17:
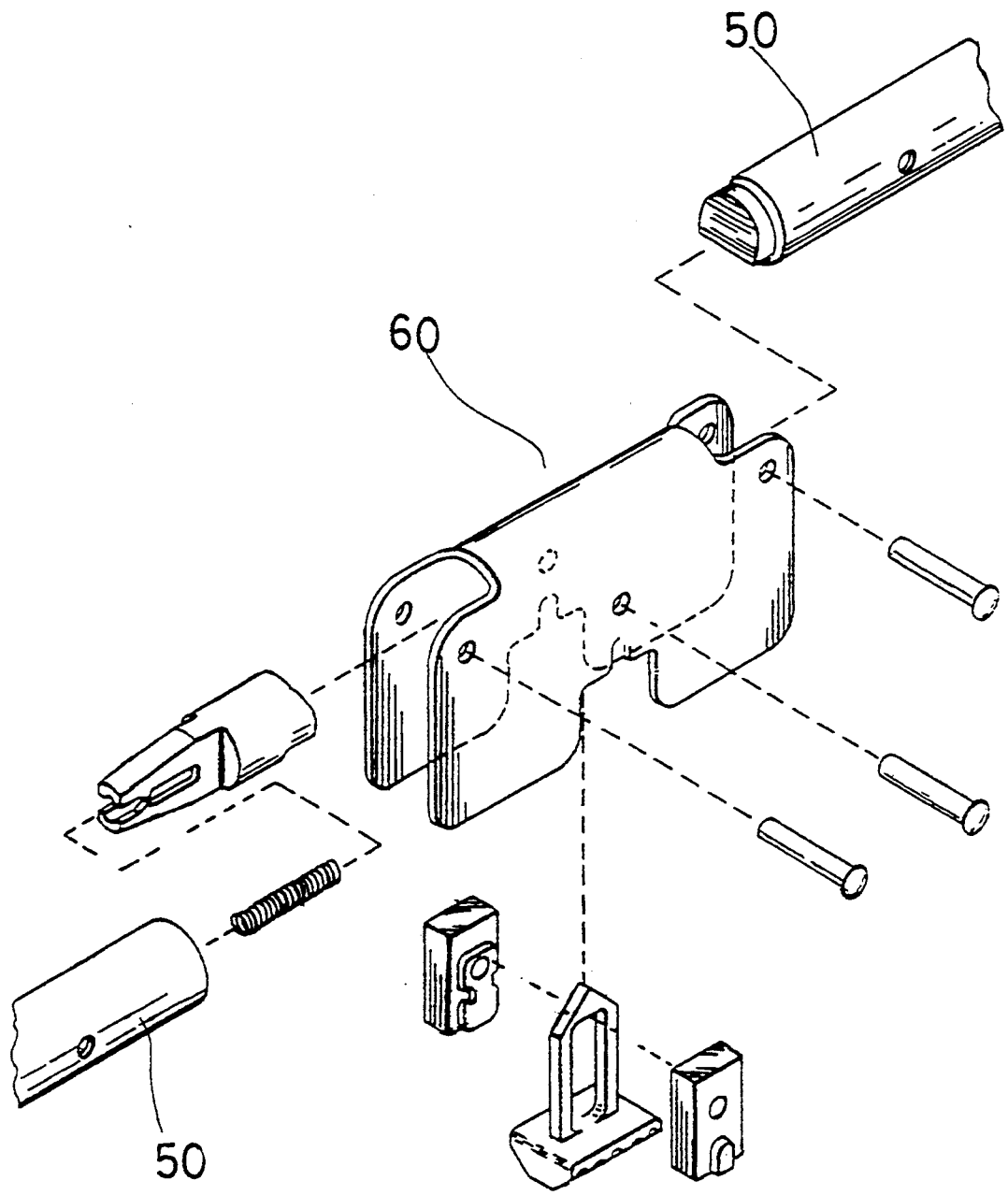
FIG. 17 is an exploded perspective view of the bending mechanism of the prior art collapsible baby bed in FIG. 16; and, FIG. 18 is an exploded perspective view of the bending mechanism and a support rod of the prior art collapsible baby bed in FIG. 15.
Figure 18:
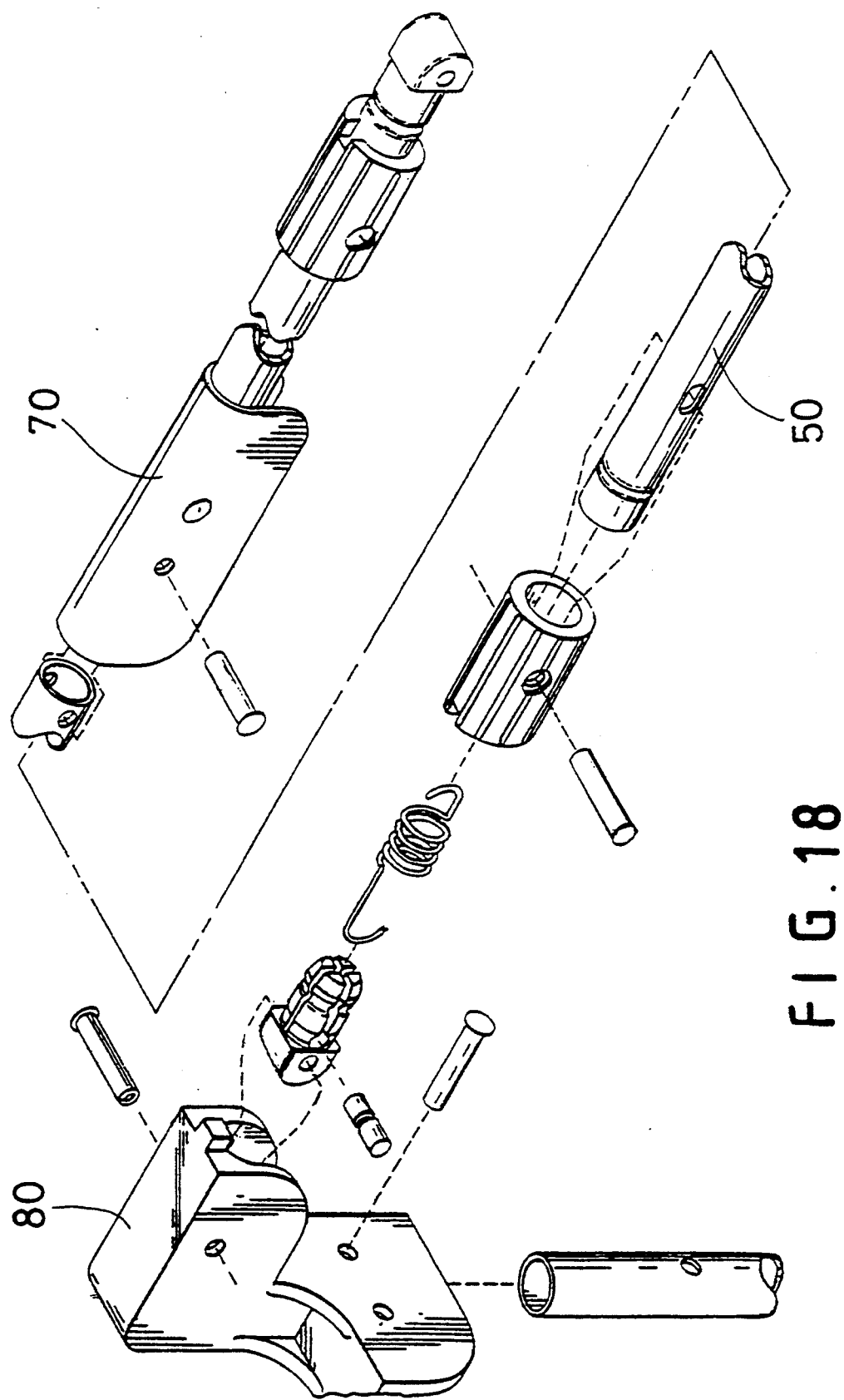

In case the baby bed is to be collapsed, first, the bed covers are to be taken off the bed frame, and the rotatably lockable connecting mechanisms 3 are bent down by pressing the push disks 37 as shown in FIGS. 11, 12 and 13, and two sides with the two foot rods 12, 12 are pushed towards the center, with the connecting mechanisms 3 moving down as shown in FIG. 12, which results in the lower horizontal support rods 13 sloping upward and the inner ends of the bottom frames 6, 6 moving upward to collapse the bed.

While the preferred embodiments of the invention have been described above, it will be recognized and understood that various modifications may be made therein and the appended claims are intended to cover all such modifications which may fall within the spirit and scope of the invention.

What is claimed is:

1. A collapsible baby bed comprising:
   (a) a plurality of extended upper horizontal side rods;
   (b) rotatably lockable connector means for coupling pairs of said extended upper horizontal side rods each to the other at first ends thereof, said rotatably lockable connector means including a first cylindrical cap having a first cylindrical disk portion and a first cylindrical cap tubular portion extending therefrom, said cylindrical disk portion having a recess formed therein defining an open chamber, a plurality of inner grooves formed within an inner circumferential surface of a wall of said open chamber, said first cylindrical tubular portion being secured to a first end of one of said extended upper horizontal side rods, a spring member mounted within said open chamber, a fitting block located within said open chamber, said spring member being sandwiched between said fitting block and an end wall of said first cylindrical cap, said fitting block having a plurality of fitting block projections for engagement within respective ones of said inner grooves and a plurality of fitting block fan-shaped projections, said rotatable lockable connector means further including a second cylindrical cap having a second cylindrical disk portion and a second cylindrical cap tubular portion, said second cylindrical disk portion having a plurality of second cylindrical disk portion fan-shaped projections extending from a central wall of said second cylindrical disk portion for engagement with respective ones of said fitting block fan-shaped projections, said central wall having a projection opening formed therethrough, a push disk insertable within said second cylindrical disk portion and having a push disk projection formed thereon for passage through said projection opening for interface with said fitting block, said second cylindrical tubular portion being secured to said first end of one of said extended upper horizontal side rods, said push disk, said second cylindrical disk portion, said fitting block, said spring member and said first cylindrical disk portion being secured by a threaded member passing therethrough, wherein (1) said fan-shaped projections of said fitting block engage said fan-shaped projections of said second cylindrical disk portion for lockingly securing said first and second cylindrical disk portions each to the other, and, (2) said fan-shaped projections of said fitting block are disengaged from said second cylindrical disk portion when displaced by a tenon extending from said push disk when said push disk is displaced, said tenon extending through an aligned opening formed in said second cylindrical disk portion;
   (c) a plurality of corner connectors secured to pairs of said horizontal side rods at second ends thereof;
   (d) a plurality of foot rods secured to respective corner connectors, extending substantially orthogonal to a plane of said horizontal side rods, each of said foot rods having a lower end secured to a respective foot support member for interface with a base surface;

(e) a plurality of lower horizontal support rods, each of said lower horizontal support rods coupled respectively to a respective one of said foot rods and a V-shaped connector tube on opposing ends thereof; and, (f) a pair of bottom frame members mounted in pivotal manner between adjacently located apex sections of said V-shaped connecting tubes and pivotally joined each to the other in rotatable displacement by a pivot pin extending therethrough.

2. The collapsible baby bed as recited in claim 1 where each of said bottom frame members includes a plurality of reinforcing rib members located internal thereto and a pin hole formed through a wall thereof for receiving said pivot pin.

* * * * *